United States Patent [19]

Stahl

[11] Patent Number: 5,060,330
[45] Date of Patent: Oct. 29, 1991

[54] SCREW-THREAD REPAIR TOOL

[75] Inventor: Zeev Stahl, Village Har Gilo, Israel

[73] Assignee: Moshe Abraham, Israel

[21] Appl. No.: 225,225

[22] Filed: Jul. 28, 1988

[30] Foreign Application Priority Data

Oct. 19, 1987 [IL] Israel .................................. 84215

[51] Int. Cl.$^5$ .............................................. B23G 5/00
[52] U.S. Cl. ...................................... 10/1 B; 408/215
[58] Field of Search ............... 408/215, 216, 219, 220, 408/222, 223, 152, 158, 159, 182, 187, 189; 10/1 B, 1 R; 81/98, 111; 30/123, 102; 7/157, 158; 82/110

[56] References Cited

U.S. PATENT DOCUMENTS

| | | | |
|---|---|---|---|
| 793,686 | 7/1905 | Sherkel | 30/102 |
| 952,042 | 3/1910 | Heggem | 10/1 B |
| 995,984 | 6/1911 | Pedery | 81/111 |
| 1,017,403 | 2/1912 | Barbarino | 10/1 B |
| 1,367,323 | 2/1921 | Oster | 10/1 |
| 1,371,660 | 3/1921 | Akers et al. | 10/1 B |
| 1,854,389 | 4/1932 | Arndt | 30/102 |
| 2,388,790 | 11/1945 | Machliet | 10/1 B |
| 2,508,291 | 6/1945 | Porro . | |
| 2,875,518 | 3/1959 | Dyczynski | 30/102 |
| 2,921,369 | 1/1960 | Stanley | 30/102 |
| 3,355,749 | 12/1967 | Steffen | 51/5 B |
| 3,793,659 | 2/1974 | Edgar | 10/1 B |
| 4,150,450 | 4/1979 | Lamb | 10/1 B |

FOREIGN PATENT DOCUMENTS

| | | | |
|---|---|---|---|
| 1151815 | 8/1983 | Canada | 10/1 B |
| 1207186 | 12/1965 | Fed. Rep. of Germany | 10/1 B |
| 2166 | of 1872 | United Kingdom | 30/102 |

Primary Examiner—Larry I. Schwartz
Assistant Examiner—R. Schultz
Attorney, Agent, or Firm—Bryan, Cave, McPheeters & McRoberts

[57] ABSTRACT

A chasing tool for repairing screw threads, which includes a substantially prismatic body with a bottom and a top surface, having on one end of the body a transverse, notch-like recess opening into the top surface and serving as a support for the threaded component the thread of which is to be repaired, and extending in a direction substantially perpendicular to the direction of the notch-like recess, starting from the other end of the body, at least one slot opening into the notch-like recess. The tool further includes a handle extending from the bottom surface of the body and is attached thereto with one degree of freedom in rotation. The handle is provided with an axially directed bore, at least a portion of which is provided with an internal thread. There is also provided at leasst one arm fitting into the slot with clearance and hingedly articulated, at a first point, to the body at a region thereof close to the other end, and at a second point, to the thermal portion of a rod at least a part of whose length is provided with an external thread matching the internal thread of the bore in the handle, the free end portion of the arm projecting into the region of the notch-like recess and is provided with thread-chasing means.

7 Claims, 2 Drawing Sheets

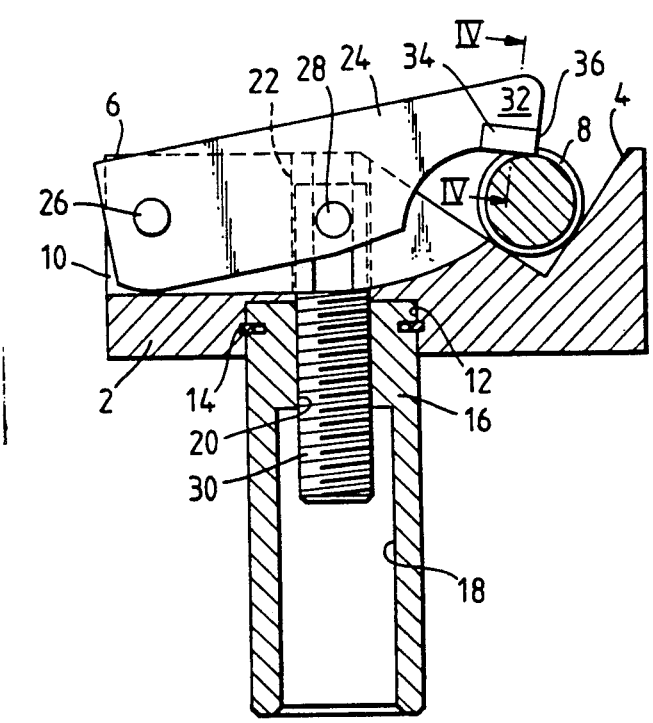
Fig.1.
Fig.2.
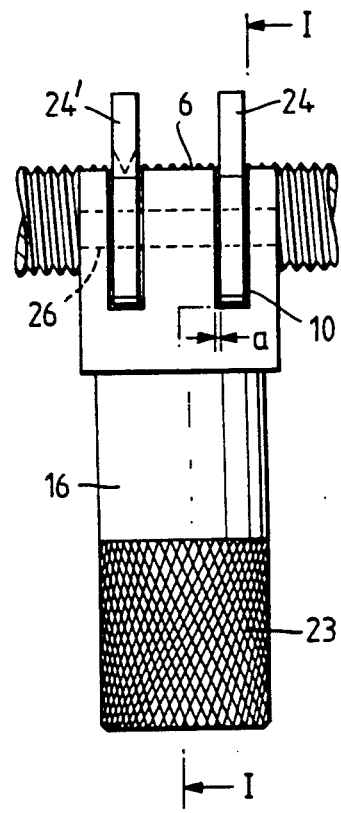
Fig.3.
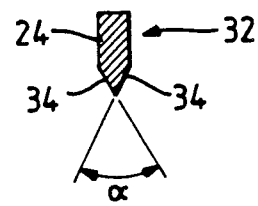
Fig.4.

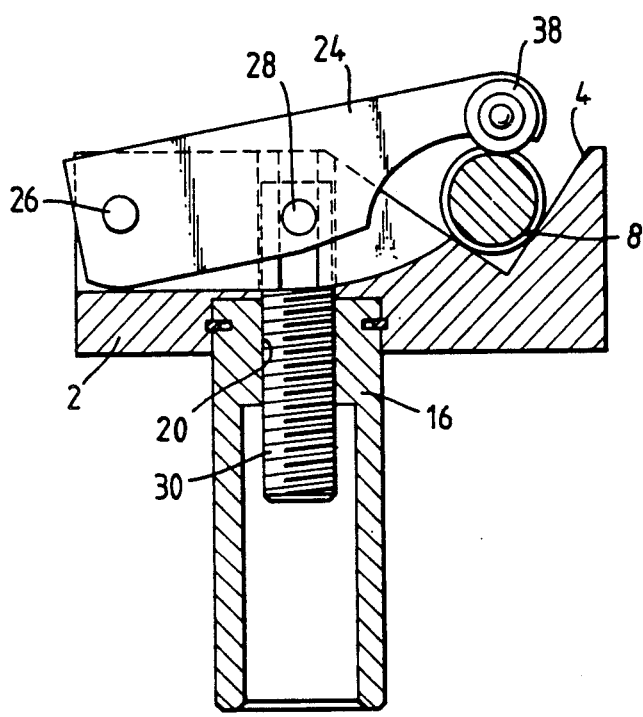
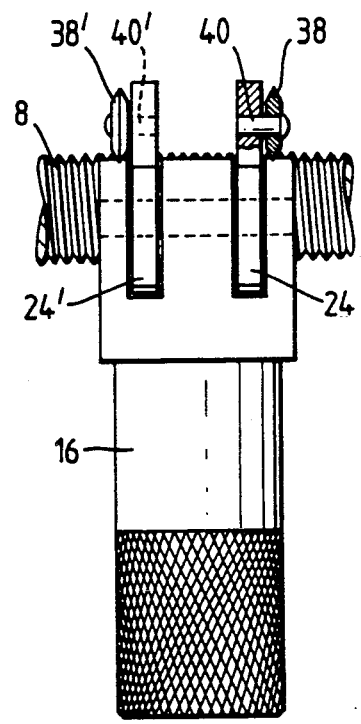
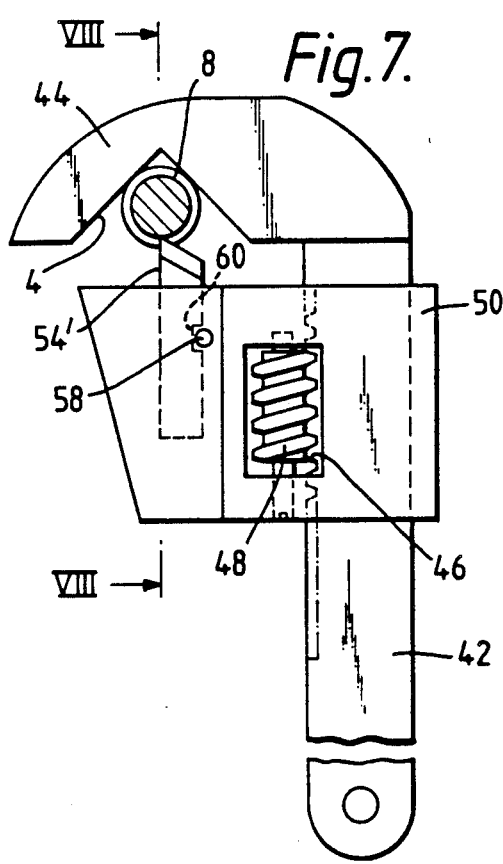
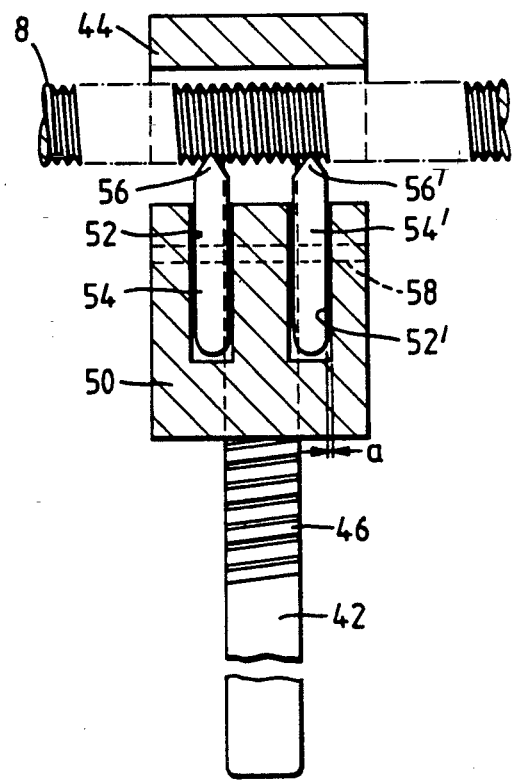

SCREW-THREAD REPAIR TOOL

The present invention relates to a chasing tool for repairing damage threads of screws.

Threads, especially screw threads, are sensitive to damage caused by impact, due to their relatively sharp crests which are easily nicked or otherwise deformed and which, when so damaged, make it difficult to apply nuts or other matching parts. Experienced mechanics are careful not to apply such components forcibly, as their own threads might be damaged in the process. Damaged screw threads should therefore be repaired before, say, reassembly of threaded components. While, in principle, screw threads can be repaired with the aid of threading dies, this would necessitate the acquisition of several large and expensive sets of dies, one set for each of the several thread standards of which, in automotive applications alone, there are at least five. For the average workshop or garage, not to speak of the "do-it-yourself" man in his basement shop, this is quite impractical. It is, of course, also possible to use a triangular file for screw thread repair; this, however, requires a considerable amount of skill, is time-consuming and most often yields poor results.

It is one of the objects of the present invention to remedy this situation and to provide a tool for the repairing of damaged screw threads that is inexpensive and simple, requires no special skills on the part of its user and produces excellent results.

This the invention achieves by providing a chasing tool for repairing screw threads, comprising a substantially prismatic body with a bottom and a top surface, having on one end of said body a transverse, notch-like recess opening into said top surface and serving as a support for the threaded component the thread of which is to be repaired, and extending in a direction substantially perpendicular to the direction of said notch-like recess, starting from the other end of said body, at least one slot opening into said notch-like recess; a handle extending from the bottom surface of said body and being attached thereto with one degree of freedom in rotation, said handle being provided with an axially directed bore, at least a portion of which is provided with an internal thread, at least one thread-chasing arm fitting into said at least one slot with clearance and hingedly articulated, at a first point, to said body at a region thereof close to said other end, and, at a second point, to the terminal portion of a rod at least part of whose length is provided with an external thread matching the internal thread of said bore in said handle, the free end portion of said arm projecting into the region of said notch-like recess and being provided with thread-chasing means, wherein rotating said handle will alter the position of said thread-chasing means of said at least one arm relative to said notch-like recess, and wherein, after contact is made by said means with said threaded component, a relative rotary movement about the axis of said threaded component, between said component and said body, will cause said thread-chasing means to repair said damaged thread.

There is further provided a chasing tool for repairing screw threads, comprising an elongated handle, one edge of which is provided with a set of teeth forming a rack; a head, attached in laterally offset relationship to one end of said handle and provided with a notch-like recess serving as support for the threaded component, the thread of which is to be repaired; a slider riding on, and guided by, said handle, a worm rotatably mounted in said slider and meshing with said rack on said handle, said slider being linearly movable along said handle by rotation of said worm; at least one thread-chasing means mounted with lateral clearance in a recess in said slider, wherein rotating said means will alter the position of said thread-chasing means relative to said notch-like recess, and wherein, after contact is made by said means with said threaded component, a relative rotary movement about the axis of said threaded component, between said component and said head, will cause said thread-chasing means to repair said damaged thread.

The invention will now be described in connection with certain preferred embodiments with reference to the following illustrative figures so that it may be more fully understood.

With specific reference now to the figures in detail, it is stressed that the particulars shown are by way of example and for purposes of illustrative discussion of the preferred embodiments of the present invention only and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

In the drawings:

FIG. 1 is an elevation, in cross section along plane I—I of FIG. 3, of the chasing tool according to the invention;

FIG. 2 is a top view of the tool;

FIG. 3 is a side view of the tool;

FIG. 4 is a view in cross section along plane IV—IV of FIG. 1;

FIG. 5 is an elevational view of another embodiment according to the invention;

FIG. 6 is a side view of the embodiment of FIG. 5;

FIG. 7 represents an elevational view of yet another embodiment of the invention, and FIG. 8 is a view in cross section along plane VIII—VIII of FIG. 7.

Referring now to the drawings, there is seen in FIGS. 1 to 3 an elongated, prismatic body 2 provided at one of its ends with a transverse, notch-like recess 4 which opens out into the top surface 6 of the body 2. This recess 4 serves as support for the threaded component 8, the thread of which is to be repaired. Further provided are two slots 10, 10' starting from the other end of the body 2 and opening into the notch-like recess 4.

On the bottom surface of the body 2 there is provided a cylindrical recess 12 in which is seated, and rotatably retained by means of a retaining ring 14, a handle 16. The latter is provided with a large bore 18 over a great part of its length, and a smaller, threaded bore 20 at its body-side end, the purpose of which will become apparent further below. In alignment with the threaded bore 20, there is provided in the body 2 a bore 22, the diameter of which is slightly larger than the outside diameter of the thread of bore 20. To afford a better grip, the handle 16 is provided with a knurled portion 23.

There are further seen two thread-chasing arms 24, 24' located, respectively, in the slots 10, 10' with some clearance and hinged to the body 2 by means of a common hinge pin 26, which permits the arms 24, 24' a swivel movement about its axis. Another common pin, 28, connects the arms 24, 24' to the end of a rod 30, the lower part of which is threaded and engages with the internal thread of the bore 20. Assuming this thread to be a standard, right-hand thread, it is clear from FIG. 1 that turning the handle 16 in the clockwise sense will pull the rod 30 (which, due to the pin 28 that links it to the arms 24, 24', cannot turn) into the handle 16, thereby causing the arms to swivel deeper into the slots 10, 10'. Turning the handle 16 in the opposite sense will obviously have the opposite effect.

The free, narrowed-down end portions of the arms 24, 24' can be seen to project into the region of the notch-like recess 4 and to be provided with a chamfered terminal portion 32, shown in cross section in FIG. 4. The chamfers 34 of this portion include an angle α, e.g. 60°, appropriate to some of the standard threads, and end in a cutting face 36.

Operation of the chasing tool according to the invention is very simple: The arms 24, 24' are lifted by turning the handle 16 in the counterclockwise direction, after which the component to be repaired, say, the bolt 8, is introduced into the notch-like recess 4. (Obviously, if the bolt is part of a larger assembly, such as in the case of the bolts of an engine head, the tool is introduced around the stationary bolt). The handle 16 is then turned into the clockwise direction until the cutting faces 36 of both arms have entered the space between the appropriate teeth of the bolt. Now, while it is quite likely that the distance between the centers of slots 10, 10' will not be an exact multiple of any particular thread pitch, the aforementioned clearances a as well as the intentionally easy fits of the hinge pins 26 and 28 in the arms will always permit each of the cutting faces 36 to be properly seated in its appropriate tooth space. A relative rotary motion is then produced between the tool and the bolt, either by turning the bolt, using, e.g. a spanner, while the tool is held stationary, or, if the bolt, as already mentioned, is part of a larger assembly that cannot be turned, by rotating the tool about the stationary bolt. Clearly, attention must be paid to the direction of rotation for proper cutting action at the cutting face 36. Depending on the severity of the damage, the repair operation might have to be carried out in stages, at each stage tightening the handle 16 slightly more than it was tightened during the previous stage.

While in principle one arm should be enough to perform the repair job, it is in practice next to impossible to carry out thread repair at or near the end of a screw without a second arm and cutting edge holding down and guiding the screw.

A second embodiment of the tool according to the invention is represented in FIGS. 5 and 6. As can be seen, the tool is basically the same as that shown in FIGS. 1–4, except for the active members of the tool which are not the terminal portions 32 with their cutting face 36, but a pair of rollers 38,38' rotatably mounted on shafts 40,40' fixedly attached to the arms 24,24'. Operation of this tool is identical to that of the previous embodiment, except that the effect of this embodiment is based on plastic deformation and not on cutting action. For this reason, it will work equally well in either sense of rotation.

FIGS. 7 and 8 represent yet another embodiment. There is seen a body in the form of a bar-like handle 42 of substantially rectangular cross section, to one end of which is attached a laterally offset head 44 provided with a notch-like recess 4 which, as in the previous embodiments, serves as support for the threaded component 8 the thread of which is to be repaired.

Over part of its inside edge, the handle 42 is provided with a set of teeth forming a rack 46, with which, like in an adjustable spanner, meshes a worm 48 rotatably mounted in a slide 50 riding on the handle 42. Again as in an adjustable spanner, the slider, guided by the handle, can be moved along the latter by manually rotating the worm 48.

In recesses 52,52' in the heavier frontal portion of the slider 50 there are mounted two cutters 54,54' of a rectangular or square cross section and a cutting face 56,56', the edges of which include the already mentioned angle α. As in the previous embodiments, adaptation to a given thread pitch is facilitated by the lateral clearances a indicated in FIG. 8. No such clearances are required or provided for the other two surfaces of the cutters 54,54'. The latter are retained in their respective recesses 52,52' by a pin 58 passing through the slider 50 and entering a groove-like recess 60 in the cutters. For re-grinding, the cutters can be removed by first removing the pin 58.

Operation of the tool is analogous to that of the previous embodiments, the cutters 54,54' being fed into the threaded component 8 by rotating the worm 48 in the appropriate direction.

It will be evident to those skilled in the art that the invention is not limited to the details of the foregoing illustrative embodiments and that the present invention may be embodied in other specific forms without departing from the spirit or essential attributes thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

I claim:

1. A chasing tool for repairing screw threads, comprising:

a substantially prismatic body with two ends and a bottom and a top surface, having on one end of said body a transverse, notch-like recess opening into said top surface and serving as a support for a threaded component the thread of which is to be repaired, two slots extending in a direction substantially perpendicular to the direction of, and opening into, said notch-like recess, said slots originating at the other end of said body;

a hand extending from the bottom surface of said body and being rotatably retained therein, said handle being provided with an axially directed bore, at least a portion of which is provided with an internal thread;

two separate arms fitting one each into said two slots with clearance and hingedly articulated by loosely fitting hinge pins, at a first point to said body at a region thereof adjacent said other end, and, at a second point, to a terminal portion of a rod at least part of whose length is provided with an external thread matching and engaging the internal thread of said bore in said handle, a free end portion of each of said arms projecting into the region of said notch-like recess and being provided with integral thread-chasing means;

wherein rotating said handle will alter the position of said thread-chasing means of said two arms relative to said notch-like recess, and wherein, after contact is made by said means with said treaded component, a relative rotary movement about the axis of said threaded component, between said component and said body, will cause said thread-chasing means to repair said screw thread.

2. The chasing tool as claimed in claim 1, wherein said thread-chasing means is constituted by the chamfered terminal portion of said arm, the chamfers including an angle appropriate to at least one standard thread and ending in a cutting face.

3. The chasing tool as claimed in claim 1, wherein said thread-chasing means is constituted by two rollers each having two chamfers and being rotatably mounted on the terminal portion of each of said arms, said chamfers including an angle appropriate to at least one standard thread.

4. The chasing tool as claimed in claim 1, wherein the handle is rotatably retained in a cylindrical recess in said body by a retaining ring.

5. The chasing tool as claimed in claim 1, further comprising a bore passing said body in alignment with said threaded bore of said handle and having a diameter freely cleared by said rod.

6. A chasing tool for repairing screw threads, comprising:
- an elongated handle, one edge of which is provided with a set of teeth forming a rack;
- a head, attached in a laterally offset relationship to one end of said handle and provided with a notch-like recess serving as support for a threaded component, the thread of which is to be repaired;
- a slider riding on, and guided by, said handle, a worm rotatably mounted in said slider and meshing with said rack on said handle, said slider being linearly movable along said handle for substantially the entire extent of said rack by rotation of said worm;
- two separate thread-chasing means mounted with lateral clearance in a recess in said slider,
- wherein rotating said worm will alter the position of said thread-chasing means relative to said notch-like recess, and
- wherein, after contact is made by said means with said threaded component, a relative rotary movement about the axis of said threaded component, between said component and said head, will cause said thread-chasing means to repair said screw thread.

7. The chasing tool as claimed in claim 6, wherein the two separate thread-chasing means are constituted by two separate cutters provided with cutting faces which have cutting edges including an angle appropriate to at least one standard thread.

* * * * *